(12) United States Patent
Edpalm et al.

(10) Patent No.: US 10,848,769 B2
(45) Date of Patent: Nov. 24, 2020

(54) METHOD AND SYSTEM FOR ENCODING VIDEO STREAMS

(71) Applicant: Axis AB, Lund (SE)

(72) Inventors: Viktor Edpalm, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/150,226

(22) Filed: Oct. 2, 2018

(65) Prior Publication Data
US 2019/0104317 A1 Apr. 4, 2019

(30) Foreign Application Priority Data
Oct. 3, 2017 (EP) .................... 17194498

(51) Int. Cl.
*H04N 19/167* (2014.01)
*H04N 19/114* (2014.01)
(Continued)

(52) U.S. Cl.
CPC ......... *H04N 19/167* (2014.11); *H04N 19/114* (2014.11); *H04N 19/115* (2014.11);
(Continued)

(58) Field of Classification Search
CPC ...... H04N 19/10; H04N 19/11; H04N 19/115; H04N 19/119; H04N 19/132
(Continued)

(56) References Cited

U.S. PATENT DOCUMENTS

| 6,456,335 B1 | 9/2002 | Miura et al. |
| 8,233,026 B2 | 7/2012 | Sylvain |

(Continued)

FOREIGN PATENT DOCUMENTS

| EP | 3013050 A1 | 4/2016 |
| GB | 2350515 A | 11/2000 |

OTHER PUBLICATIONS

Meddeb et al., "Region-Of-Interest Based Rate Control Scheme for High Efficiency Video Coding", 2014 IEEE International Conference on Acoustic, Speech and Signal Processing (ICASSP), May 4, 2014, pp. 7338-7342.

(Continued)

*Primary Examiner* — Dominic D Saltarelli
(74) *Attorney, Agent, or Firm* — Volpe Koenig

(57) ABSTRACT

A method and a video encoding system for encoding a video stream include video data representing sequentially related image frames, wherein the image frames include a predefined first subarea and a predefined second subarea. The method comprises defining a first bitrate budget, defining a second bitrate budget, encoding the video stream including applying the first bitrate budget to video data of the first subarea and applying the second bitrate budget to video data of the second subarea. The video encoding system comprises an image processor for processing the image stream, a memory including values defining a first bitrate budget and a second bitrate budget, respectively, and a first subarea and a second subarea of the image frames of the image stream and an encoder arranged to encode the image stream, the encoding including applying the first bitrate budget to video data of the first subarea and applying the second bitrate budget to video data of the second subarea.

16 Claims, 6 Drawing Sheets

(51) Int. Cl.
*H04N 19/115* (2014.01)
*H04N 19/146* (2014.01)
*H04N 19/17* (2014.01)
*H04N 19/124* (2014.01)

(52) U.S. Cl.
CPC ......... *H04N 19/124* (2014.11); *H04N 19/146* (2014.11); *H04N 19/17* (2014.11)

(58) Field of Classification Search
USPC .................... 375/240.02, 240.03, 240.09
See application file for complete search history.

(56) References Cited

U.S. PATENT DOCUMENTS

| | | | |
|---|---|---|---|
| 9,036,028 B2* | 5/2015 | Buehler | G08B 13/19602 |
| | | | 348/159 |
| 9,654,725 B2 | 5/2017 | Fan et al. | |
| 10,198,808 B2* | 2/2019 | Weiss | G06T 7/11 |
| 2006/0062478 A1 | 3/2006 | Cetin et al. | |
| 2011/0109753 A1* | 5/2011 | Srinivasamurthy | H04N 19/61 |
| | | | 348/208.4 |
| 2012/0169923 A1 | 5/2012 | Millar et al. | |
| 2013/0021434 A1 | 1/2013 | Ahiska | |
| 2014/0341280 A1 | 11/2014 | Yang et al. | |
| 2016/0345022 A1* | 11/2016 | Ju | G06F 3/1415 |
| 2016/0360218 A1 | 12/2016 | Pandit et al. | |
| 2018/0027244 A1* | 1/2018 | Chen | H04N 19/124 |
| | | | 375/240.03 |
| 2018/0033405 A1* | 2/2018 | Tall | G09G 5/37 |

OTHER PUBLICATIONS

Zhan ma et al., "Modeling of Rate and Perceptual Quality of Compressed Video as Functions of Frame Rate and Quantization Stepsize and Its Applications", IEEE Transactions on Circuits and Systems for Video Technology, Institute of Electrical and Electronics Engineers, USA, vol. 22, No. 5, May 1, 2012, pp. 671-682.

Zavio.com, "3MP Panoramic Fisheye IP Camera User Manual Table of Contents", Oct. 19, 2015, pp. 1-58.

European Search Report for European Application No. 17194498.6 dated Apr. 5, 2018.

Communication pursuant to Article 94(3) EPC dated Nov. 4, 2019 for the European Patent Application No. 17194498.6.

Lai et al., "A region based multiple frame-rate tradeoff of video streaming," 2004 International Conference on Image Processing, 2004. ICIP '04., Singapore, pp. 2067-2070 vol. 3 (2004).

"Consideration Points that may affect Video Streaming", May 31, 2012 (May 31, 2012), pp. 1-12, XP055736588, <:https://hanwha-security.eu/wp-content/uploads/2015/12/Network-Camera-Video-Settings.pdf>.

* cited by examiner

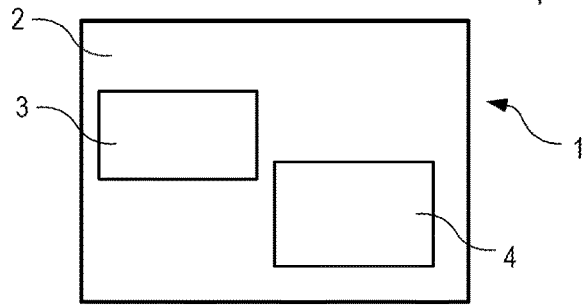
FIG. 1a
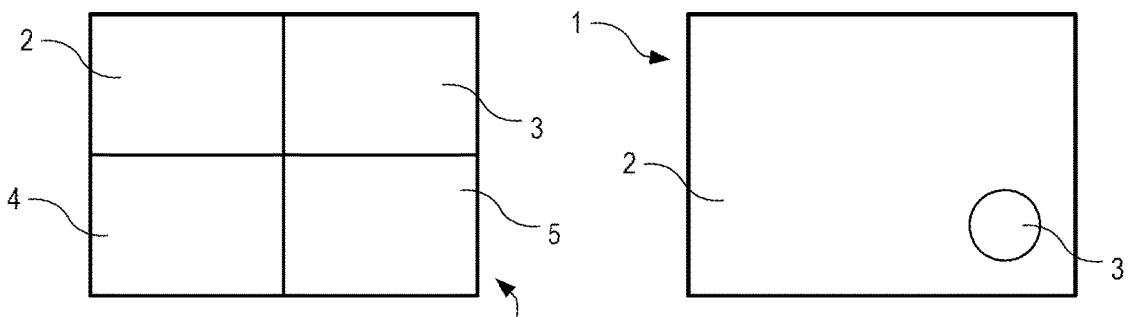
FIG. 1b
FIG. 1c
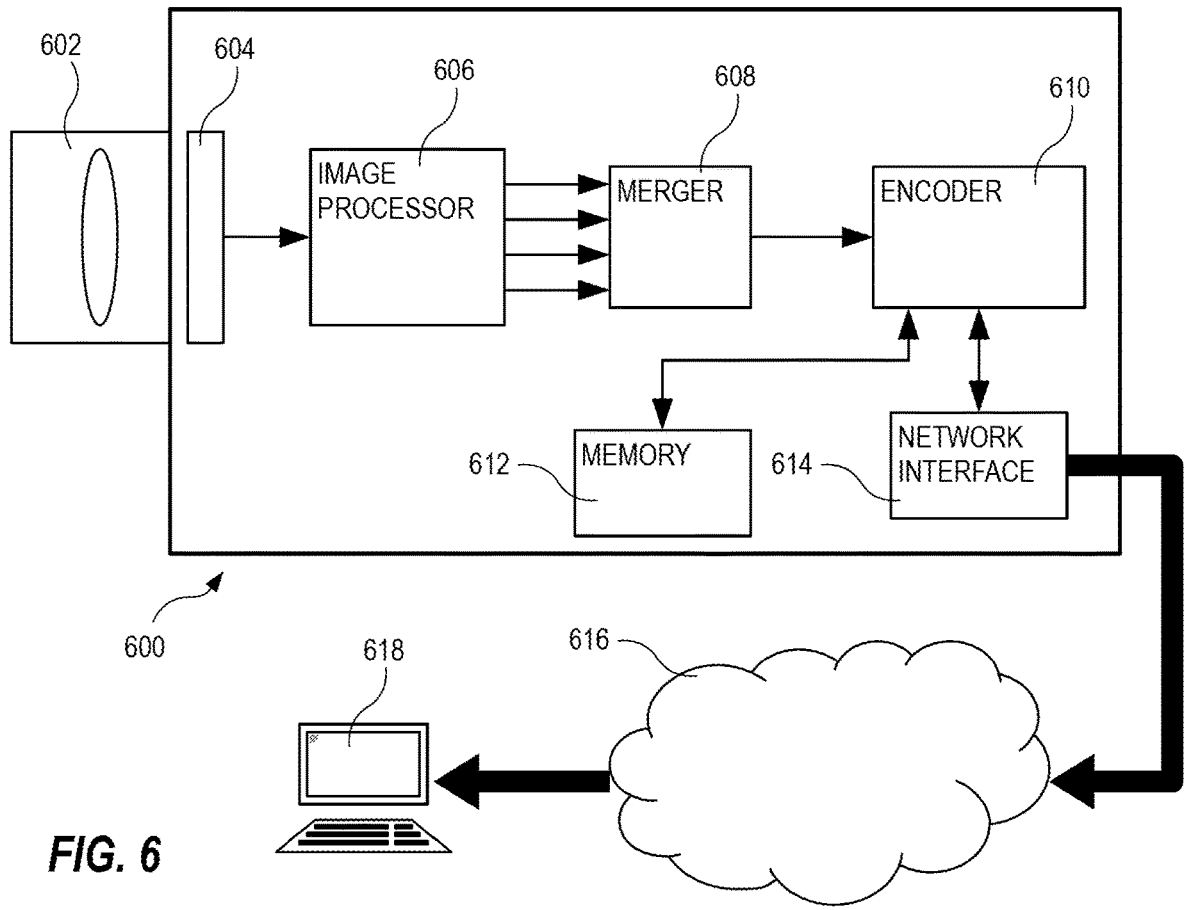
FIG. 6

METHOD AND SYSTEM FOR ENCODING VIDEO STREAMS

TECHNICAL FIELD

The present invention relates to a method and a system for encoding video streams. In particular video streams in which various areas of frames in the video stream have different characteristics.

BACKGROUND

Surveillance systems and monitoring systems of today often include plenty of cameras or are at least arranged to capture video covering large areas. Many modern surveillance and or monitoring systems are digital and transmit the video over computer networks instead of implementing classic analog transmission of the video. Video, i.e. moving images, requires a lot of bandwidth. However, the bandwidth required by a video stream may be controlled by adjusting the compression of the digital data, changing the frame rate, adjusting the length of Group Of Picture, i.e. the number of P- and B-frames between two consecutive I-frames. By adjusting such parameters, the quality of the video stream is decreased or increased. Accordingly, if a video stream requires more bandwidth than allotted, then the quality of the video in the video stream must be decreased in order to keep the bandwidth of the video stream within the allotted margins. Today this is managed by various schemes of adjusting single ones of the parameters mentioned above or a combination of them. The decreasing of the quality of the video stream will in some cases render the received video stream entirely useless as the quality is decreased too much. It is known to apply different video quality at different areas of the streamed video view, e.g. detecting areas that are less interesting than other areas of the streamed video view and encoding the less interesting areas with less quality than the more interesting areas. One problem with this method is that if there are only small areas that are of no interest, the bandwidth required will be high or the quality of the interesting areas will be decreased.

SUMMARY

The present teachings improve the encoding of image streams and enable optimization of bandwidth utilization for an image stream.

A method for encoding video streams according to claim 1 and a video encoding system according to claim 12 are presented. Further embodiments are presented in the dependent claims.

In particular, according to the embodiments, there is a method for encoding a video stream. The video stream including video data representing sequentially related image frames, wherein the image frames include a predefined first subarea and a predefined second subarea. The method comprises defining a first bitrate budget, defining a second bitrate budget, encoding the video stream including applying the first bitrate budget to video data of the first subarea and applying the second bitrate budget to video data of the second subarea. By defining different bitrate budgets for different areas of the image frame of the image stream and encoding accordingly, the image stream will be utilizing the bits that it is allowed to use effectively. This may result in less use of data or simply more efficient use of available bandwidth or data capacity. For example, an area that is of minor interest and should have had a low video quality encoding in a pure video quality based scheme may, despite the video quality setting, render a lot of data if the area is so dark that the noise in the captured images are increased. By defining the bitrate for the area, the video quality will be dynamically adjusted in order to keep the bitrate lower than the bitrate budget for that area.

In other embodiments, the first and second subareas may be non-overlapping. In yet some embodiments applying a first bitrate budget and a second bitrate budget to the video data of the first subarea and the second subarea respectively includes setting a compression parameter of the video data in relation to the bitrate budget defined for each subarea.

Moreover, in some embodiments, applying a first bitrate budget and a second bitrate budget to the video data of the first subarea and the second subarea respectively includes setting a frame rate of the video data in relation to the bitrate budget defined for each subarea.

In some embodiments, applying a first bitrate budget and a second bitrate budget to the video data of the first subarea and the second subarea respectively includes setting the GOP-length of the video data of each subarea in relation to the bitrate budget for each subarea.

Moreover applying a first bitrate budget to the video data of the first subarea may include calculating the bitrate of the video data in the first subarea, comparing the calculated bitrate of the first subarea to the bitrate budget for the first subarea, and if the calculated bitrate for the first subarea is greater than the bitrate budget for the first subarea then adjust at least one parameter from the group of compression parameter for the first subarea, frame rate for the first subarea, and GOP-length for the first subarea, in order to decrease the future bitrate for the first subarea, and applying a second bitrate budget to the video data of the second subarea may include calculating the bitrate of the video data in the second subarea, comparing the calculated bitrate of the second subarea to the bitrate budget for the second subarea, and if the calculated bitrate for the second subarea is greater than the bitrate budget for the second subarea then adjust at least one parameter from the group of compression parameter for the second subarea, frame rate for the second subarea, and GOP-length for the second subarea, in order to decrease future bitrate for the second subarea.

Some embodiments also comprise defining a third bitrate budget of a third subarea which is included in the image frames, and encoding the video stream applying the third bitrate budget to video data of the third subarea. Applying a third bitrate budget to the video data of the third subarea may include calculating the bitrate of the video data in the third subarea, comparing the calculated bitrate of the third subarea to the bitrate budget for the third subarea, and if the calculated bitrate for the third subarea is greater than the bitrate budget for the third subarea then adjust at least one parameter from the group of compression parameter for the third subarea, frame rate for the third subarea, and GOP-length for the third subarea, in order to decrease future bitrate for the third subarea.

Yet some embodiments comprise changing the value of the bitrate budget for at least one of the sub areas. This, is for instance, advantageous for video streams including areas in which the interest varies for different points in time as the bitrate budget may be decreased for the periods of less interest. Some examples may be found in a camera view from a shop wherein the camera view covers a passage where customers normally, during opening hours, pass and some windows and a door. During the opening hours the view of the passage is the area most interesting to have high bandwidth imagery of, but when closed the windows and the door may be the most interesting areas which then should be arranged to provide high bandwidth imagery.

In some embodiments the video data of sequentially related image frames includes video data from at least two different video streams. The video data from one of the two different video streams forms the first subarea of the sequentially related image frames and the video data from the other one of the two different video streams forms the second subarea of the sequentially related image frames. This enables two different image streams to be encoded into one image stream with differing bitrate budgets. Thereby the data required by the image stream may be decreased, at least in situations where one of the merged image streams require substantially less data and/or bandwidth.

The video data forming the first sub area may be captured using a first image sensor and the video data forming the second sub area may be captured using a second image sensor.

Alternatively, the video data forming the first sub area may be cropped and dewarped video data from an image sensor capturing images through a wide angle lens and wherein the video data forming the second sub area may be cropped and dewarped video data from the same image sensor capturing images through the wide angle lens.

According to a second aspect, a video encoding system comprises an image processor for processing the image stream, a memory including values defining a first bitrate budget and a second bitrate budget, respectively, and a first subarea and a second subarea of the image frames of the image stream, an encoder arranged to encode the image stream, the encoding including applying the first bitrate budget to video data of the first subarea and applying the second bitrate budget to video data of the second subarea. By defining different bitrate budgets for different areas of the image frame of the image stream and encoding accordingly the image stream will be utilising the bits that it is allowed to use effectively. This may result in less use of data or simply more efficient use of available bandwidth or data capacity. For example, an area that is of minor interest and should have had a low video quality encoding in a pure video quality based scheme may despite the video quality setting render a lot of data if the area is so dark that the noise in the captured images are increased. By defining the bitrate for the area the video quality will be dynamically adjusted in order to keep the bitrate lower than the bitrate budget for that area.

In some embodiments the image processor outputs at least two image streams and the video generating system further includes a merger arranged to merge the at least two image streams from the image processor into a single image stream. This enables two different image streams be encoded into one image stream with differing bitrate budgets. Thereby the data required by the image stream may be decreased, at least in situations where one of the merged image streams require substantially less data and/or bandwidth.

In some embodiments, the video encoding system comprises a second image processor for processing a second image stream, and a merger arranged to merge the at least two image streams from the image processors into a single image stream. The advantages of these embodiments are the same as described in the previous paragraph. Applying a first bitrate budget and a second bitrate budget to the video data of the first subarea and the second subarea respectively may include setting a compression parameter of the video data in relation to the bitrate budget defined for each subarea.

A further scope of applicability of the present teachings will become apparent from the detailed description given below. However, it should be understood that the detailed description and specific examples, while indicating preferred embodiments, are given by way of illustration only, since various changes and modifications within the scope will become apparent to those skilled in the art from this detailed description. Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features will become apparent from the following detailed description of a presently described embodiment, with reference to the accompanying drawings, in which FIGS. 1a-c are schematically depicting streaming views and subareas defined within the streaming views according to embodiments, FIG. 6 is a schematic block diagram over a video camera and the system the video camera is included in, according to embodiments.

Further, in the figures like reference characters designate like or corresponding parts throughout the several figures.

DETAILED DESCRIPTION OF EMBODIMENTS

Figure 2:
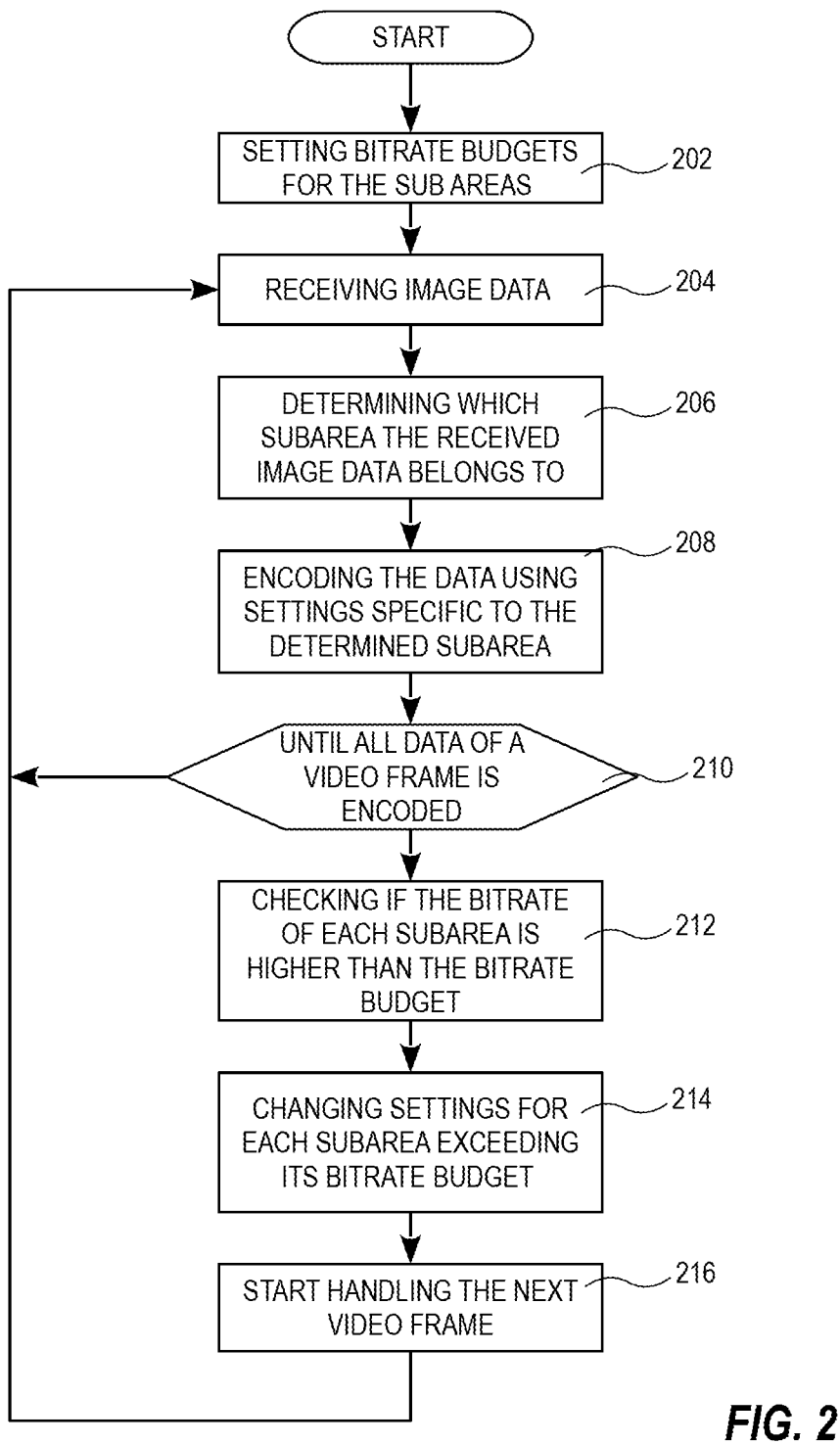
FIG. 2 is a flowchart of a process for encoding a streaming video view in which subareas have been defined.

The present teachings relate to video, i.e. motion images, and encoding of video. According to some embodiments the video to be encoded is a single video stream formed from a sequence of image frames. The single video stream is representing a streaming view, i.e. the view that will be displayed when the video stream is decoded and displayed at a receiving device. Subareas are defined in the streaming view, hence in the image frames forming the motion video stream. These subareas may be pre-defined or defined during operation. In some applications, as will be understood from this specification, the sub areas are naturally predefined, while in other applications the subareas may be defined or redefined during operation.

Examples of streaming views and subareas arranged in these streaming views are showed in FIG. 1a-c. In FIG. 1a the streaming view 1 includes four sub areas 2, 3, 4, and 5. Each of these subareas could for example be views from different cameras, areas cropped from a single large view, areas cropped and dewarped from a wide angle lens such as a fisheye lens or a 360 lens, etc. A dewarped area, view, or image is an area, view, or image in which a distorted representation resulting from use of a wide angle lens is corrected into a rectilinear projection of the area, view, or image. A rectilinear projection is a projection in which straight lines in a scene remain straight in the resulting captured image or video.

In FIG. 1b the streaming view 1 includes two subareas 2, 3. The subarea 2 may for instance be a dewarped view from a 360-degrees lens or a fish eye lens, hence this view may be some kind of panorama or a dewarped crop from the captured scene. Then the subarea 3 may be the view from the 360-degrees lens or the fisheye lens. Such views from 360-degrees lenses or the fisheye lenses are commonly circular and thus the shape of the subarea 3 displaying this view.

In FIG. 1c the streaming view 1 includes three subareas 2, 3, 4. The entire streaming view may be arranged to display one scene captured by a camera and the subareas 3 and 4 may merely be areas defined in the streaming view in order to be processed differently, in accordance with the embodiments, than the subarea 2.

The arrangements of the subareas presented in FIGS. 1a-c are only presented as examples and the skilled person will readily realise many other arrangements.

Now referring to FIG. 2 showing a flowchart representing a process for encoding a streaming video view 1 in which subareas, 2, 3, 4, have been defined. Initially, before any encoding is started, each subarea, 2, 3, 4, defined for the streaming video view is designated a bitrate budget, step 202. Then image data representing a portion of the streaming image view 1 is received, step 204, and a subarea 2, 3, 4, to which the received image data belongs is determined, step 206. The received image data may for instance, in case of h 264 encoding, be an image block, an encoding block, a macroblock, a frame slice, etc. After the determining of which one of the subareas the received image data belongs to the subarea of the received image data is determined, i.e. the process checks which subarea of the streaming video view 1 the received image data belongs to, step 206. This relation between image data and subarea may be determined by comparing a position within the streaming video view 1 of the image data with a position and extent within the streaming video view of the subareas 2, 3, 4. Then the subarea of the image data is determined to be the subarea 2, 3, 4, encompassing the position of the received image data or to be the subarea 2, 3, 4, including a greater portion of the received image data. When the received image data have been related to a subarea 2, 3, 4, then the received image data is encoded using encoding settings and/or parameters specified for the specific subarea 2, 3, 4, step 208. The process will then check if all image data representing a video frame representing the streaming video view 1 have been processed, step 210. If all image data of a video frame has not been processed then the process returns to step 204 in order to process further image data representing the presently processed video frame. If all image data of a video frame has been processed then the process continues by checking if the bitrate of each subarea is lower than the set bitrate budget, step 212. The checking of the bitrate in step 212 may be performed in many different ways. For instance, the process may produce a mean bitrate value over a predetermined number of frames for each of the subareas and then check these mean values against the set bitrate budget of each subarea. The number of frames used to generate the mean value may be any number from a few frames all the way to a number of minutes of video frames. Another way of checking the bitrate in step 212 is to simply check the bitrate of each of the subareas of the latest video frame against the set bitrate. The encoding settings and/or parameters are then changed for each subarea for which the bitrate budget is exceeded in the checking step 212 in order to lower the bitrate of the data from this/these subareas for the next video frame, step 214. When the encodings settings have been checked and possibly changed, then the process starts processing the next video frame representing the streaming video view, step 216, by returning to step 202.

Examples of settings and/or parameters that may be changed in order to adjust the bitrate of a subarea are the quantization parameter, QP, found in many video encoding schemes, e.g. in in h.264, h.265, etc. Another setting that may be set is if the block of a subarea is to be coded as a P-block or an I-block during the encoding of the next frame. Yet other settings may be Frames Per Second or rate of frame drops.

In embodiments arranged to change the Frames Per Second (FPS) for a subarea that exceeds a bitrate threshold, the change of FPS may be implemented in various ways. One way to do it is to set coding blocks in the subarea in skip mode and select a rate of blocks being processed in skip mode that would correspond to the desired change in frame rate for that subarea. Skip mode for coding blocks are a concept from encoding schemes, e.g. h.264, that is known to the person skilled in the art. A skip mode may be implemented for Coding Units in h.265 as well. The idea of using skip mode is that a block or a coding unit in skip mode carry very little information and during decoding such a block relies on data from a previous image frame. In encoding schemes not implementing the concept of skip blocks, but still uses interframe encoding, it is possible to decrease the Frames Per Second for a subarea by not updating the image data of the subarea when it is time to encode the image frame. Thereby, there is no difference between the image data to be encoded and the image data of the previously encoded image data of that subarea and, thus, when encoded using interframe encoding there is very little data to encode as there is no change in image data. A common property of these schemes implementing the function of changing FPS as a tool for keeping the data rate of a subarea below a predetermined threshold is that they have a base FPS for the encoding of the entire image frame in the video and that the change in FPS are not possible to change to a higher frequency than this base FPS. However, the FPS of a subarea is decreased by a factor of two by setting the blocks in a subarea of every second total video frame in skip mode.

The streaming video view may be generated in many ways. Some examples will be given below, but they should not be considered limited to these embodiments. The person skilled in the art will from these examples readily realize additional embodiments.

In one embodiment the bitrate of each subarea 2, 3, 4, 5, also is compared to a lower threshold value set for each subarea 2, 3, 4, 5. If the bitrate of a subarea 2, 3, 4, 5, is below a corresponding lower threshold, i.e. a threshold set for that subarea, then the encoding settings and/or parameters may be changed in order to increase the bitrate of the subarea. This increase of the bitrate of a subarea will balance the video quality of the video from the subarea so that the video quality is not unnecessary low when the video quality may be higher within the bitrate budget for the subarea.

Figure 3:
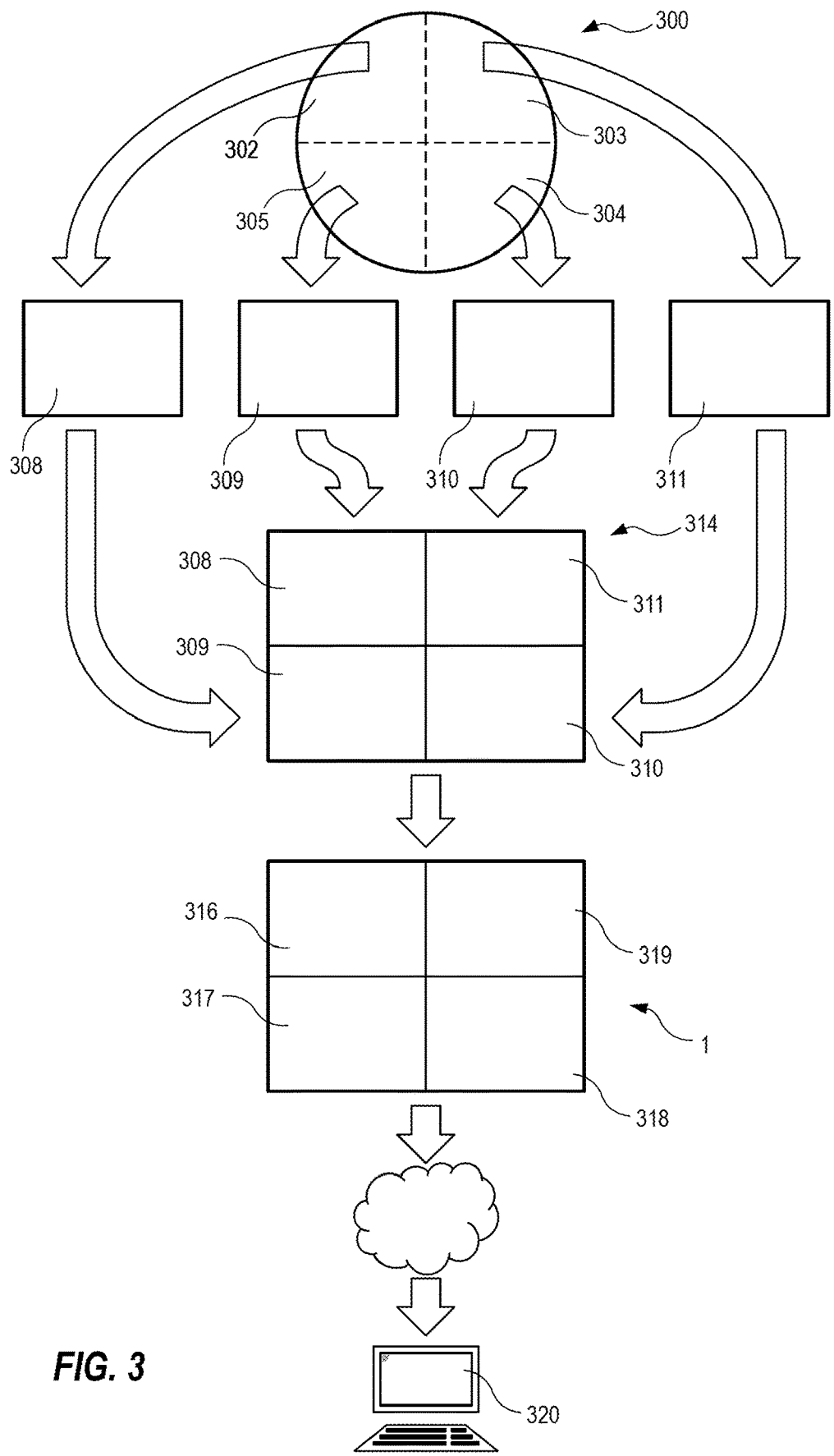
FIG. 3 is schematically depicting an original image stream being transformed to a final image stream according to embodiments.

Now referring to FIG. 3, according to some embodiments a 360-degree video stream 300 or other similar fisheye video stream is captured by a digital camera. A 360-degree view represented by the 360-degree video stream 300 is divided into four partial video streams 302, 303, 304, 305, which all are dewarped into video streams having rectilinear imagery 308, 309, 310, 311. Image processing may be applied to the captured 360-degree video stream 300, to each partial video stream 302, 303, 304, 305, or to each dewarped video stream 308, 309, 310, 311. All of the dewarped video streams 308, 309, 310, 311 are merged into a merged video stream 314. The merged video stream 314 is then encoded in accordance with the embodiments. During the encoding each of the image area in the merged video stream corresponding to each of the dewarped video streams 308, 309, 310, 311, will be encoded as separate subareas 316, 317, 318, 319, in accordance with the embodiments. The encoded video stream will then be sent to a client 320, a video server, or another recipient of video streams.

Figure 4:
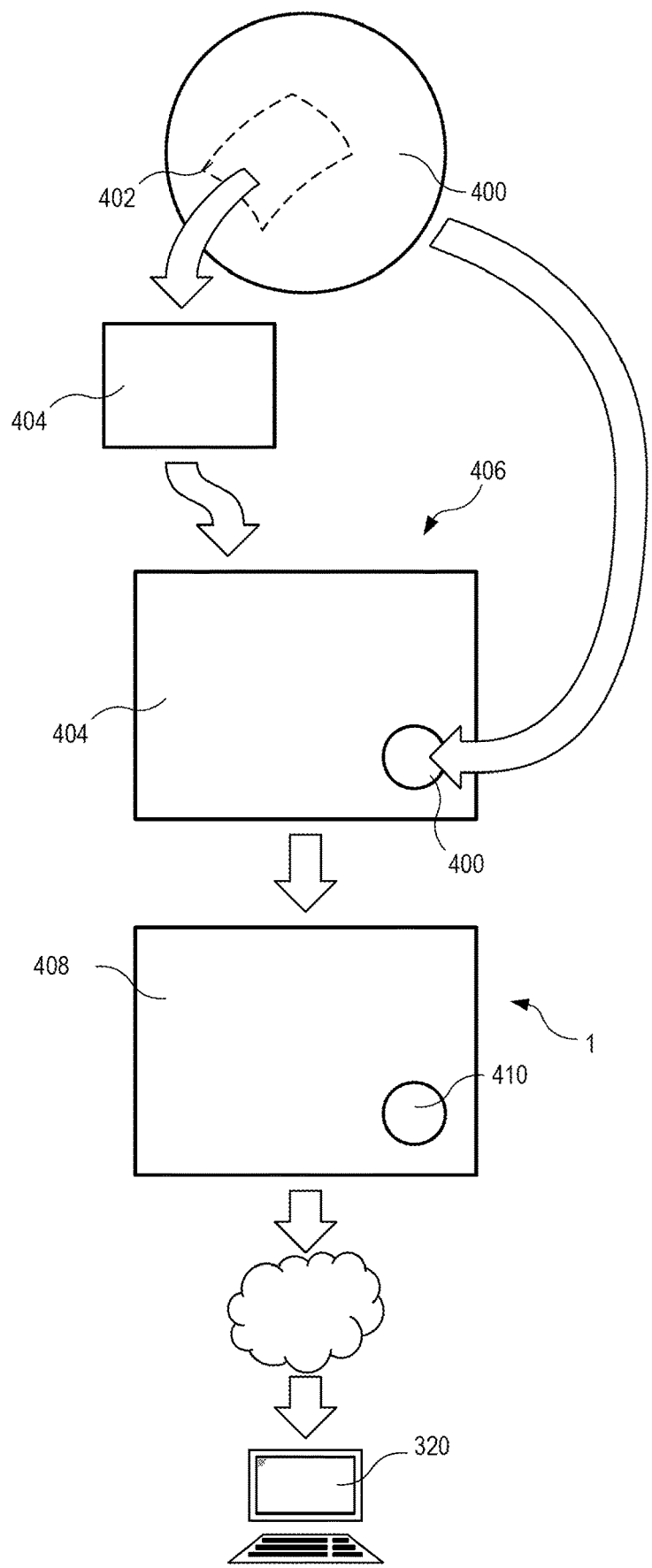
FIG. 4 is schematically depicting an original image stream being transformed to a final image stream according to embodiments.

Now referring to FIG. 4, according to some embodiments a 360-degree video stream, 400, or other similar fisheye video stream, is captured by a digital camera. A partial area stream 402 from the 360-degree video stream 400, i.e. a partial area in the 360-degree view, is selected and dewarped into a rectilinear representation 404 of the partial area stream 402. The rectilinear representation 404 and a downscaled version of the 360-degree video stream 400 are then merged into the composite view 406. The encoding of the merged video stream 406 is then performed according to any method described herein. The area of the rectilinear video stream 404 is encoded as a first subarea 408 and the scaled down 360-degree video stream is encoded as a second subarea 410. The encoded composite video stream is sent to a client 320, a video server, or another recipient of video streams.

Figure 5:
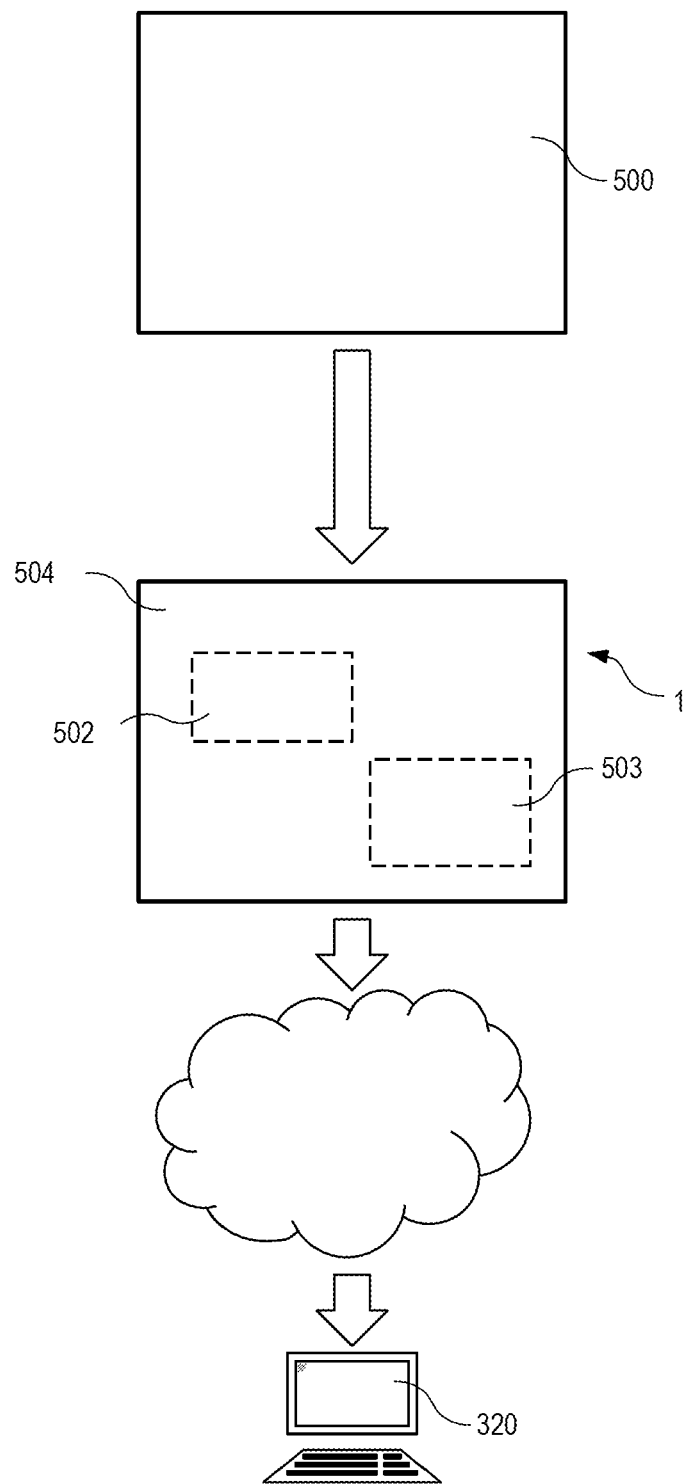
FIG. 5 is schematically depicting an image stream in which subareas are defined according to some embodiments.

Now referring to FIG. 5, according to some embodiments a video stream 500 is captured. The video stream may be any video stream from a close up video to a wide angle video. In the view of the video stream 500 there is defined subareas 502, 503, 504. The subareas 502, 503, 504 are in this case only areas specified within the video stream 500 and therefore containing the video data of the video stream 500. In the example two subareas 502, 503, are defined in the video view of the stream, thereby resulting in a third subarea 504 being the entire area of the video stream 500 excluding the other two subareas 502, 503. The subareas 502, 503, 504, may then be experiencing differentiated encoding as presently described. Hence, the video stream is encoded using different compression parameters for the different subareas 502, 503, 504. The encoded video stream is sent to a client 320, a video server, or another recipient of video streams.

In some embodiments, a bitrate budget may be set individually for each single subarea. However, in other embodiments a bitrate budget may be set individually for a subset of the subareas while the rest of the subareas share a common bitrate budget. Alternatively, a total bitrate budget for the entire video view may be set and then an individual bitrate budget may be set for one or more of the subareas. In this latter case the subareas not having an individual bitrate budget will share the bitrate budget left when the individual subareas have been subtracted from the total bitrate budget. In yet another alternative embodiment one or more groups of subareas are given individual group bitrate budgets. In such embodiment subgroups not given any bitrate budget may share a bitrate budget that is available after the group or groups have been given their bitrate budgets. The person skilled in the art will readily realize many other combinations of the ways of setting the bitrate budgets for the subareas.

The encoding process according to embodiments may be implemented in a video camera, a video encoder, a video server, etc.

Now referring to FIG. 6, a video camera 600 according to embodiments includes a lens 602 for capturing the light from the scene that are to be registered and focuses this light onto an image sensor 604. The lens may be a 360-degree lens, a fisheye lens, a wide angle lens, a panoramic lens, etc. The video camera 600 further includes an image processor 606 that is arranged to process the image data captured by the image sensor 604. Generally the image processor 606 is arranged to adjust the white balance of the captured image data, scale the captured image data, reduce the effects of image noise, etc. In this embodiment the image processor, in addition to the general image processing operations, also is arranged to split the image data stream of the captured scene into four separate image streams each representing a portion of the entire scene captured. Moreover, the image processor may be arranged to dewarp the images of each of the four image streams. A merger 608, an encoder 610, a memory 612, and a network interface 614 are also arranged in the camera 600. The merger 608 is arranged to merge the four separate image streams into a single image stream. The encoder 610 is arranged to encode the data of the image stream adapting the encoding of different sub areas within the streamed image view to bitrate budgets stored in memory 612. The positions and the size of the subareas are also stored in the memory 612. The memory 612 may be any type of memory, e.g. a persistent memory, a non-persistent memory, or one persistent and one non-persistent memory, and may be arranged to store, in addition to storing parameters of subareas, bitrate budgets, and encoding settings/parameters, program code for various functions of the camera. The network interface 614 may be any known network interface for initiating and managing data transport from and to the camera 600. For example may the network interface include protocol stacks for various communication protocols, e.g IPv4/v6, HTTP, HTTPSa, SSL/TLSa, QoS Layer 3 DiffServ, FTP, SFTP, CIFS/SMB, SMTP, Bonjour, UPnPTM, SNMP v1/v2c/v3 (MIB-II), DNS, DynDNS, NTP, RTSP, RTP, TCP, UDP, IGMP, RTCP, ICMP, DHCP, ARP, SOCKS, SSH, etc., and it may be arranged for communication via any one or any combination of a Local Area Network, a Wide Area Network, the Internet, cable connections, wireless connections, mesh networks, etc. The network interface are thus connected to a network 616, which may be any one or any combination of a Local Area Network, a Wide Area Network, the Internet, cable connections, wireless connections, mesh networks, etc. In a system including the camera 600 there may be a client 618 arranged to access the video stream generated by the camera and/or to control the camera. The client 618 may be any electronic device having control means and a display, e.g. a PC, a workstation, a tablet computer, a desktop computer, a laptop computer, a palmtop computer, a mobile phone, etc.

Figure 7:
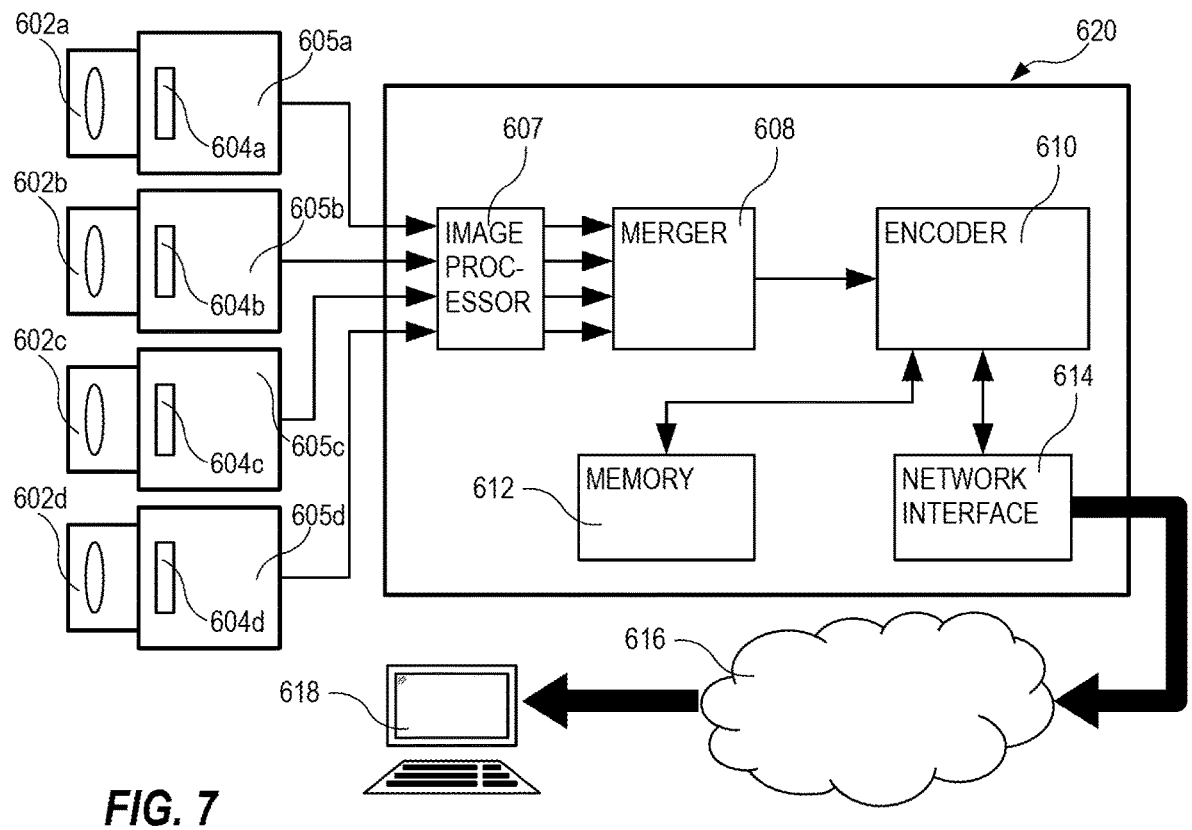
FIG. 7 is a schematic block diagram over a video capturing and encoding device and system according to embodiments.

Now referring to FIG. 7 showing an alternative arrangement including an image processing and encoding module 620. The image processing and encoding module 620 may be an encoder having image sensor heads 605*a-d* connected to it or it may form a video camera when combined with image sensor heads 605*a-d*. Each image sensor head 605*a-c* includes an image sensor 604*a-d* and a lens 602*a-d* focusing the light from the camera view of each of the image sensor heads on to each image sensor 604*a-d*. The image processing and encoding module includes an image processor 607, a merger 608, an encoder 610 a memory 612, and a network interface 614. The image processor 607 perform the same operations as the image processor 606 described in connection with FIG. 6. One difference between them is that the image processor 607 in FIG. 7 receives four video streams instead of one and have to process these in parallel or in assigned time slots. The merger 608, the encoder 610, the memory 612, and the network interface 614 may be arranged in the same way as described in connection with FIG. 6. Further, the system depicted in FIG. 7 includes a network 616 and a client 618 which may be of any type described in connection with FIG. 6.

Figure 8:
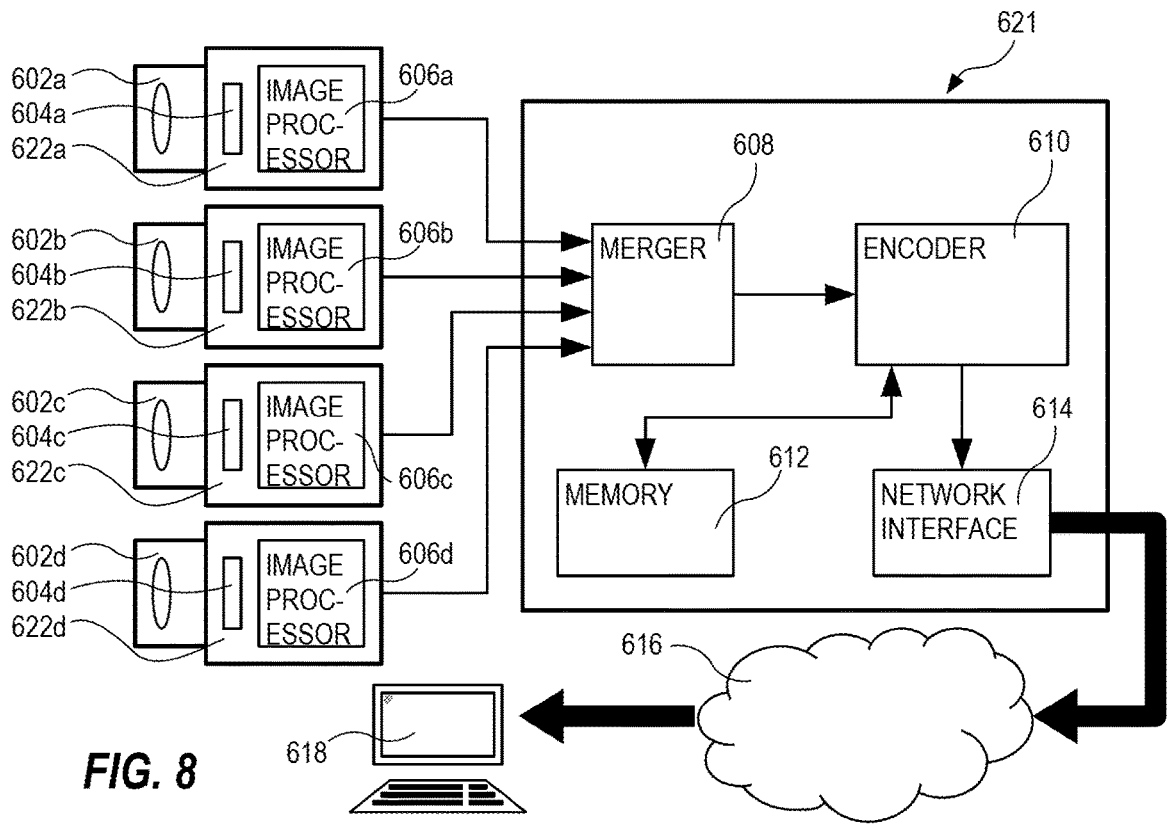
FIG. 8 is a schematic block diagram over a video capturing and encoding device and system according to embodiments.

Now revering to FIG. 8 showing yet another alternative arrangement including an image arranging and encoding module 621, camera heads 622*a-d*, a network 616, and a client 618. Each camera head includes a lens 602*a-d*, an image sensor 604*a-d*, and an image processor 606*a-d*. The four camera heads 622*a-d* are connected to the image arranging and encoding device 621. The image arranging and encoding module 621 includes a merger 608, an encoder 610, a memory 612, and a network interface 614. The merger 608 is arranged to receive image streams from the camera heads 622*a-d* and merge them into one image stream. The areas occupied by each image stream in the merged image stream may represent a subarea. The encoder 610, the memory 612, and the network interface 614 may be the same or corresponding devices as described in connection with FIGS. 6 and 7. The network 616 and the client 618 may be the same or similar as the corresponding features described in connection with FIGS. 6-7. Even if the examples given in relation to FIGS. 7 and 8 discloses the use of four image sensor heads the person skilled in the art readily realizes that the systems described in these figures may include two, three, four, five, etc., image sensor heads and still present the advantages.

Each of the devices or modules, e.g. image processor 606, 606*a-d*, 607, merger 608, encoder 614, may be implemented as program code performing the functions and operations of each device or module when executed by a processor or they may be implemented in hardware by means of electronic circuitry and/or integrated circuits. These devices or modules may also be implemented as a combination of program code and electronic circuitry and/or integrated circuits. Moreover, the functions and operations of these devices and modules may be executed in the same processor or in separate processors.

The invention claimed is:

1. Method for encoding a video stream, the video stream including video data representing sequentially related image frames, wherein the image frames include a predefined first subarea and a predefined second subarea, the method comprising:
setting a first bitrate budget for the first subarea,
setting a separate second bitrate budget for the second subarea that is independent of the first bitrate budget for the first subarea,
encoding the video stream including applying the first bitrate budget to video data of the first subarea by checking if the bitrate of the video data of the first subarea exceeds the first bitrate budget and changing encoding settings for the first subarea in order to lower the bitrate of the video data of the first subarea if the first bitrate budget is exceeded and applying the second bitrate budget to video data of the second subarea by checking if the bitrate of the video data of the second subarea exceeds the second bitrate budget and changing encoding settings for the second subarea in order to lower the bitrate of the video data of the second subarea if the second bitrate budget is exceeded, and
wherein the act of changing encoding settings includes changing the framerate of the video data of the subarea for which the encoding settings are to be changed.

2. Method according to claim 1, wherein the first and second subareas are non-overlapping.

3. Method according to claim 1, wherein the act of changing the encoding setting includes changing a compression parameter of the video data of the subarea for which the encoding setting is to be changed.

4. Method according to claim 1, wherein the act of changing the encoding setting includes changing a GOP-length of the video data of the subarea for which the encoding setting is to be changed.

5. Method according to claim 1, wherein the act of checking if the bitrate of the video data of the first subarea exceeds the first bitrate budget includes calculating the bitrate of the video data in the first subarea, and comparing the calculated bitrate of the subarea to the first bitrate budget, and wherein the act of checking if the bitrate of the video data of the second subarea exceeds the second bitrate budget includes calculating the bitrate of the video data in the second subarea, comparing the calculated bitrate of the second subarea to the second bitrate budget.

6. Method according to claim 1, further comprising:
changing the value of the bitrate budget for at least one of the sub areas.

7. Method according to claim 1, wherein the video data of sequentially related image frames includes video data from at least two different video streams, wherein the video data from one of the two different video streams forms the first subarea of the sequentially related image frames and the video data from the other one of the two different video streams forms the second subarea of the sequentially related image frames.

8. Method according to claim 7, wherein the video data forming the first sub area is captured by means of a first image sensor and the video data forming the second sub area is captured by means of a second image sensor.

9. Method according to claim 7, wherein the video data forming the first sub area is cropped and dewarped video data from an image sensor capturing images through a wide angle lens and wherein the video data forming the second sub area is cropped and dewarped video data from the same image sensor capturing images through the wide angle lens.

10. Video encoding system comprising:
an image processor for processing the image stream,
a memory including values defining a first subarea and a second subarea of the image frames of the image stream and values defining a first bitrate budget for the first subarea and a second separate bitrate budget for the second subarea that is independent of the first bitrate budget for the first subarea, and
an encoder arranged to encode the image stream, the encoding including applying the first bitrate budget to video data of the first subarea by checking if the bitrate of the video data of the first subarea exceeds the first bitrate budget and changing encoding settings for the first subarea in order to lower the bitrate of the video data of the first subarea if the first bitrate budget is exceeded and applying the second bitrate budget to video data of the second subarea by checking if the bitrate of the video data of the second subarea exceeds the second bitrate budget and changing encoding settings for the second subarea in order to lower the bitrate of the video data of the second subarea if the second bitrate budget is exceeded, and wherein the act of changing encoding settings includes changing the framerate of the video data of the subarea for which the encoding settings are to be changed.

11. Video encoding system according to claim 10, wherein the image processor outputs at least two image streams and wherein the video generating system further includes a merger arranged to merge the at least two image streams from the image processor as two subareas, being the first and second subareas, into a single image stream.

12. Video encoding system according to claim 10, further comprising a second image processor for processing a second image stream, and a merger arranged to merge the at least two image streams from the image processor as two subareas, being the first and second subareas, into a single image stream.

13. Video encoding system according to claim 10, wherein changing the encoding setting includes changing a compression parameter of the video data of the subarea for which the encoding setting is to be changed.

14. Video encoding system according to claim 10, wherein the act of changing the encoding setting includes changing a GOP-length of the video data of the subarea for which the encoding setting is to be change.

15. Method for encoding a video stream, the video stream including video data representing sequentially related image frames, wherein the image frames include a predefined first subarea and a predefined second subarea, the method comprising:

setting a first bitrate budget for the predefined first subarea, setting a separate second bitrate budget for the predefined second subarea that is independent of the first bitrate budget for the predefined first subarea, and encoding the video stream including applying the first bitrate budget to video data of the first subarea by checking if a bitrate of the video data of the first subarea exceeds the first bitrate budget and, upon the first bitrate budget is exceeded, changing an encoding setting for the first subarea in order to lower the bitrate of the video data of the first subarea and applying the second bitrate budget to video data of the second subarea by checking if a bitrate of the video data of the second subarea exceeds the second bitrate budget and, upon the second bitrate budget is exceeded, changing an encoding setting for the second subarea in order to lower the bitrate of the video data of the second subarea, wherein changing the encoding setting includes changing a GOP-length of the video data of the subarea for which the encoding setting is to be changed.

16. Video encoding system comprising:

an image processor for processing the image stream, a memory including values defining a first subarea and a second subarea of the image frames of the image stream and values defining a first bitrate budget for the first subarea and a second separate bitrate budget for the second subarea that is independent of the first bitrate budget for the first subarea, and an encoder arranged to encode the image stream, the encoding including applying the first bitrate budget to video data of the first subarea by checking if a bitrate of the video data of the first subarea exceeds the first bitrate budget and, upon the first bitrate budget is exceeded, changing an encoding setting for the first subarea in order to lower the bitrate of the video data of the first subarea and applying the second bitrate budget to video data of the second subarea by checking if a bitrate of the video data of the second subarea exceeds the second bitrate budget and, upon the second bitrate budget is exceeded, changing an encoding setting for the second subarea in order to lower the bitrate of the video data of the second subarea, wherein changing the encoding setting includes changing a GOP-length of the video data of the subarea for which the encoding setting is to be changed.

* * * * *